United States Patent [19]
Newnes et al.

[11] Patent Number: 5,636,965
[45] Date of Patent: Jun. 10, 1997

[54] VACUUM ASSISTED STICK PLACER

[75] Inventors: William R. Newnes; Steven W. Michell, both of Salmon Arm, Canada

[73] Assignee: Newnes Machine Ltd., Salmon Arm, Canada

[21] Appl. No.: 422,226

[22] Filed: Apr. 14, 1995

[30] Foreign Application Priority Data

Oct. 28, 1994 [CA] Canada ................................ 2,134,598

[51] Int. Cl.⁶ ...................................................... B65G 57/18
[52] U.S. Cl. ................................ 414/789.5; 198/468.4; 414/793
[58] Field of Search ................................ 198/468.4, 680; 414/789.5, 793

[56] References Cited

U.S. PATENT DOCUMENTS

| | | |
|---|---|---|
| 2,928,559 | 3/1960 | Mosely. |
| 3,352,434 | 11/1967 | Zuercher. |
| 3,643,621 | 2/1972 | Newnes. |
| 3,823,834 | 7/1974 | Rysti. |
| 4,144,976 | 3/1979 | Rysti. |
| 4,229,133 | 10/1980 | Johnson. |
| 4,360,303 | 11/1982 | Rysti. |
| 4,610,360 | 9/1986 | Forslund ............... 209/518 |
| 4,801,233 | 1/1989 | Ritola .................. 414/789.5 |
| 4,810,152 | 3/1989 | Gillingham ........... 414/789.5 |
| 4,878,803 | 11/1989 | Whiddon .............. 414/789.5 |
| 5,244,341 | 9/1993 | Dion ..................... 414/789.5 |

Primary Examiner—Karen B. Merritt
Assistant Examiner—Janice L. Krizek
Attorney, Agent, or Firm—Antony C. Edwards

[57] ABSTRACT

A vacuum assisted stick placer for (a) retrieving a spacing stick from a J-hook on a J-hook stick conveyor, whereon a first broad side of the stick is supported on the J-hook, and (b) placing the stick onto a top surface of a stack of lumber has a selectively actuable vacuum gripping device for (a) selectively applying a vacuum to the first broad side of the stick whereby the stick may be adhered to the vacuum gripping device when the vacuum gripping device is in a stick retrieving position snug beneath the first broad side of the stick supported in the J-hook, and (b) selectively removing the vacuum from the first broad side of the stick whereby the stick may be released from the vacuum gripping device, when the vacuum gripping device is in a stick placing position substantially opposed to the stick retrieving position and proximate the top surface of the stack of lumber, a first translation device for rotatably translating the vacuum gripping device in an arcuate path and a second translation device for substantially linearly translating the vacuum gripping device in a radial direction from the arcuate path, the first and second translation devices translating the vacuum gripping device between the stick retrieving position and the stick placing position, a support frame for supporting the first and second translation devices over the stack of lumber, whereby a second broad side of the stick opposed to the first broad side may be placed into contact with the top surface of the stack of lumber.

24 Claims, 14 Drawing Sheets

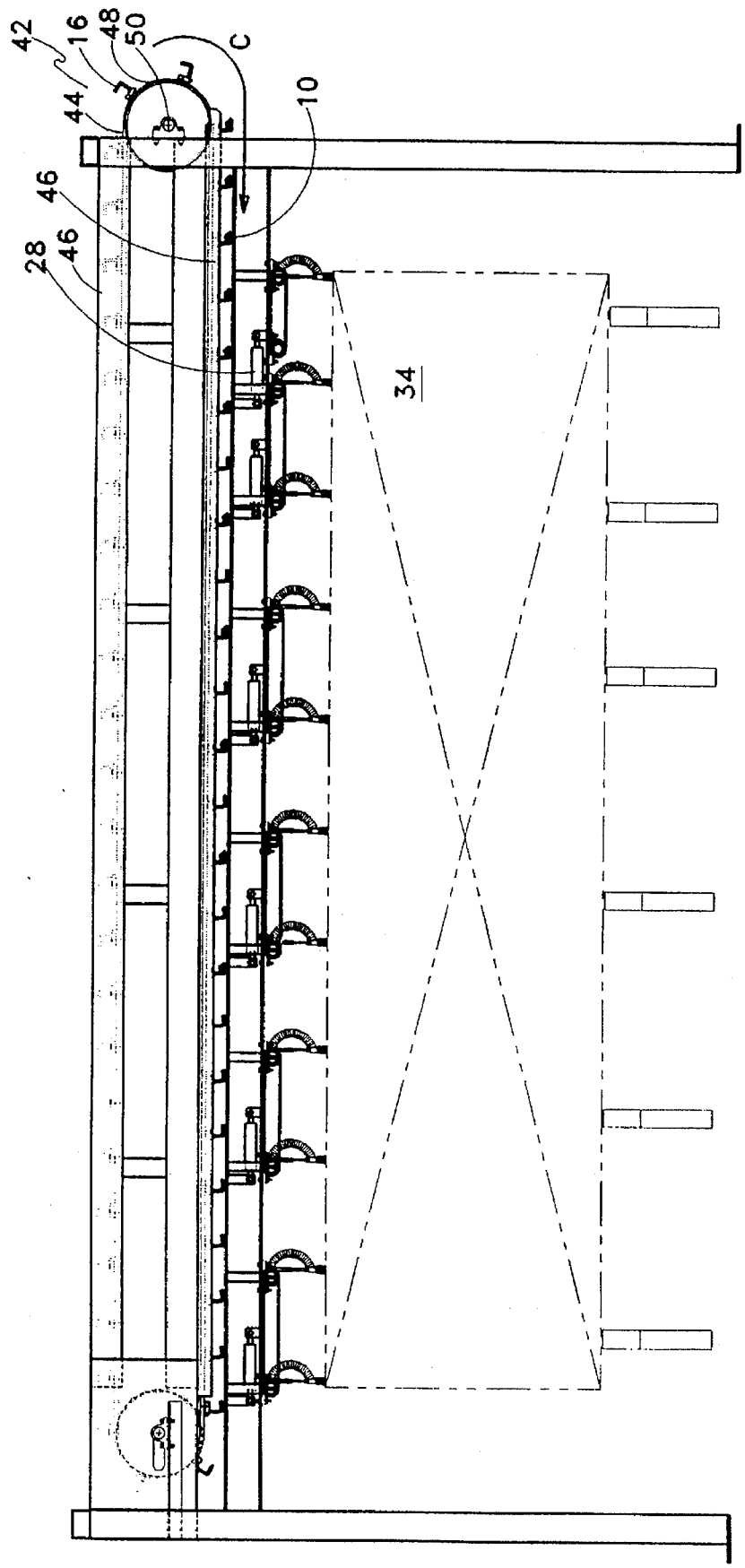

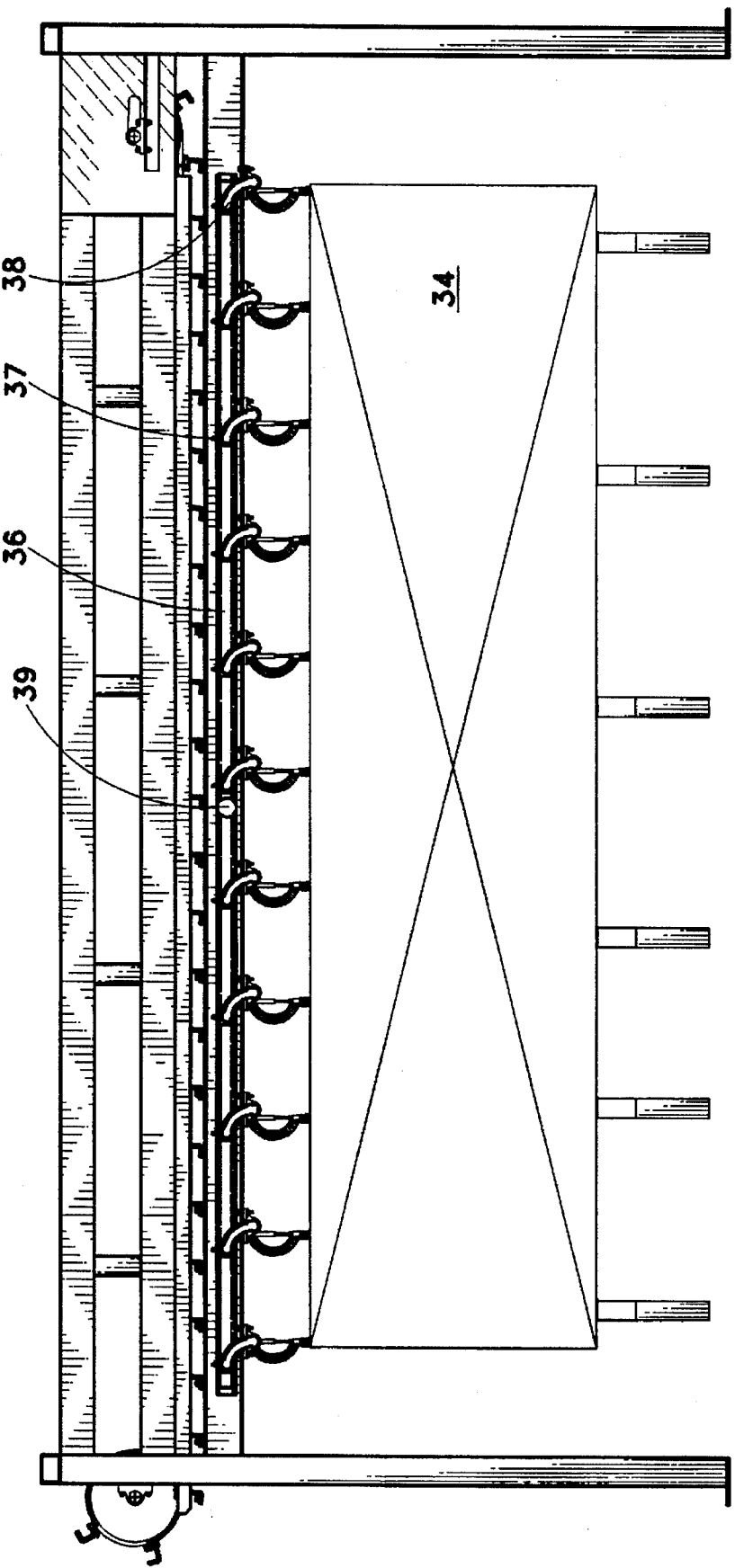

FIG.9.a
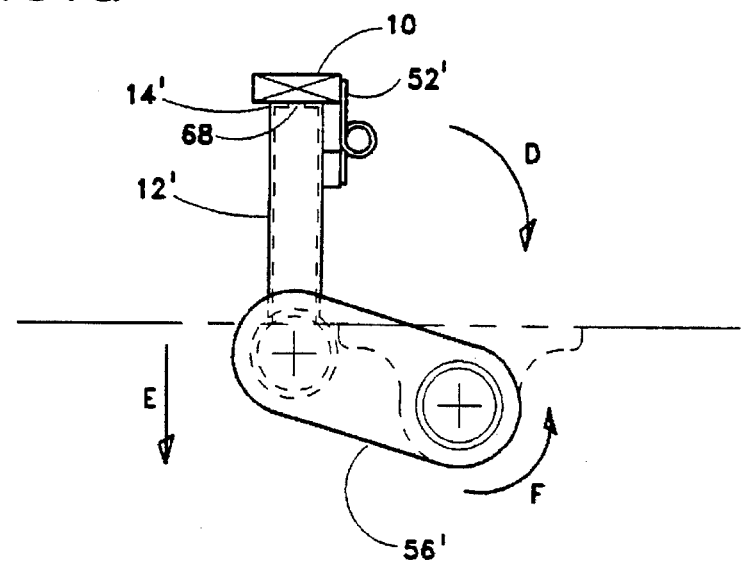
FIG.9b
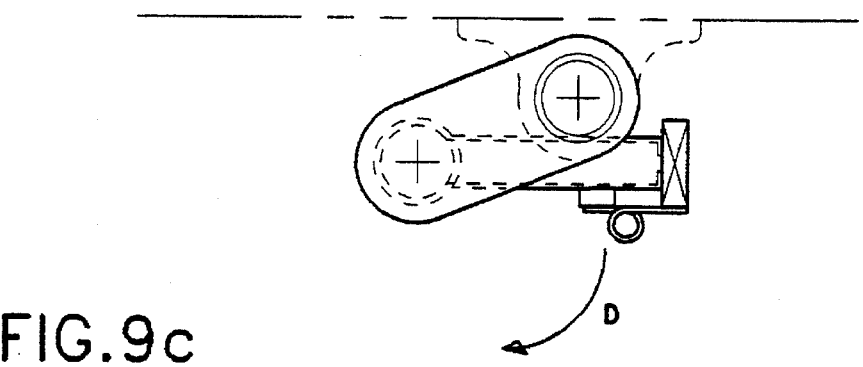
FIG.9c
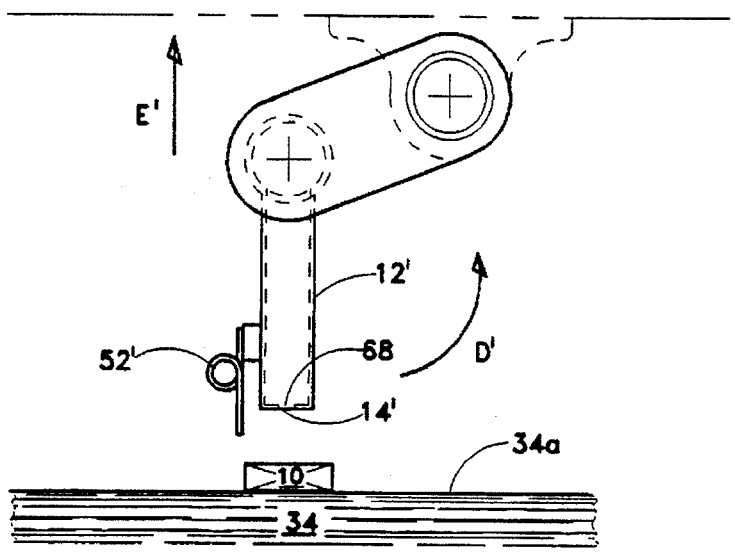

VACUUM ASSISTED STICK PLACER

FIELD OF THE INVENTION

This invention relates to the field of stick placer apparatus and, in particular, to spacing stick retrieval and depositing mechanisms within such apparatus wherein retrieval is from conventional J-hook stick conveyors.

BACKGROUND OF THE INVENTION

Spacing stick placer apparatus are used to place spacing sticks between stacked tiers of green lumber. The sticks serve to provide space between the tiers of lumber to allow air flow for either kiln drying or air drying, as well as to stabilize the tiered lumber package. Typically, spacing stick placer apparatus are used in conjunction with lumber stackers that stack the green lumber in tiers, the stick placer apparatus conventionally being placed over the lumber stacker. The sticks are placed in spaced parallel array across the width of the lumber tiers, the sticks aligned perpendicular to the long dimension of the lumber. The number of sticks so placed depends upon the length of the lumber and the desired spacing between the sticks. In modern sawmill practices it is desired that the first and last stick of the array of sticks placed onto a tier of lumber be placed flush with the ends of the lumber. It is also desired that a stick placer be able to accomodate lumber of difference lengths.

It is conventional for sticks to be conveyed over the lumber stack from a stick allocating device by means of a continuous chain from which depend spaced apart hooks. The spaced apart hooks are "J" shaped so as to receive and support a single stick per hook. The "J" shaped hooks, hereinafter J-hooks, are translated past the stick allocating device on the continuous chain. An opposed pair of J-hook continuous chains co-operate with the stick allocating device so that opposed pairs of J-hooks receive single sticks from the stick allocating device and convey those sticks along the continuous chain over the lumber stack. The chains move linearly along an opposed pair of tracks supported above the lumber stack, the tracks supported conventionally by a support frame. The J-hook continuous chains are supported at either end of the opposed pair of tracks by sprockets, one of which is conventionally a drive sprocket, the other an idler sprocket.

Applicant is aware of prior art spacing stick depositing devices used in conjunction with conventional J-hook continuous chains, notably, Rysti, U.S. Pat. No. 3,823,834 which issued Jul. 7, 1974 for a "Method and Device for Performing the Insertion of Piling Strips in Timber Packages". The Rysti U.S. Pat. No. '834 method and device first stops the stick conveyor, then carrying hooks mounted on an elevated frame removes the sticks from the stick conveyor. The elevating frame is then lowered to the uppermost lumber tier where the sticks are pushed off the carrying hooks by a plurality of fingers so as to deposit the sticks on the lumber tier.

Applicant is also aware of Rysti, U.S. Pat. No. 4,360,303 which issued Nov. 23, 1982 for a "Method and Apparatus for Locating Spacer Strips between Layers of Timber Packages". The Rysti U.S. Pat. No. '303 method and apparatus also stops the stick conveyor at an appropriate position over a lumber stacks. The sticks are guided down onto the top surface of the uppermost tier of lumber by a plurality of free-fall depressors or plungers.

Applicant is further aware of Dion et al, U.S. Pat. No. 5,244,341 which issued on Sep. 14, 1993 for a Lath Placer. Dion et al teaches placing lath binders and stickers onto stacks of lumber using a rotating vacuum assisted delivery system for retrieval of lath from a curved magazine. A selectively actuable vacuum is applied to adhere the lath to the rotating delivery arm. Rotation of the delivery arm releases the lath onto the top surface of a lumber tier upon the selectively actuable vacuum being removed to allow the lath to fall, on edge, from the rotating arm.

It has been found that because spacing sticks or stickers are significantly thicker than lath, the Dion et al device will not necessarily place sticks flat but may place them so that they remain standing on edge. Further, it has been observed that dropping sticks from the transfer arm of the Dion et al device results in inaccurate placement of the sticks onto the stack of lumber. This is particularly problematic when attempting to place spacing sticks at the ends of the stack of lumber as the sticks may fall from the stack of lumber.

Consequently it is an object of the present invention to provide a device for the positive placement of spacing sticks onto a stack of lumber. In this regard Applicant is aware of U.S. Pat. No. 4,801,233 which issued to Ritola on Jan. 31, 1989 for a "Sticker Placer Apparatus" which teaches a device for the positive placement of spacing sticks onto a stack of lumber. Sticks are fed from a stick conveyor into inclined stick feeding pockets, the stick feeding pockets indexing individual sticks into the grip of actuable stick supporting and pinching arms rotatably mounted at the lowermost end of vertically translatable placement plungers. The vertical position of the placement plungers, and thus the position of the stick supporting and pinching arms, is governed in the Ritola device by an actuating arm releasing or increasing the tension on a flexible chain extending between the stick supporting and pinching arms and the actuating arm. Positive placement of a stick from the supporting and pinching arms is accomplished when the lowermost end of the vertically translatable placement plunger engages the top surface of a stack of lumber. Continuing detensioning of the flexible chain by the actuating arm allows the rotatably mounted stick support arm to rotate under the return biasing force of a resilient spring so as to deposit the stick from the support arm onto the stack of lumber.

In view of the complexity of the Ritola device, and in view of the fact that applicant is aware that the Ritola device is prone to jamming, it is an object of the present invention to provide a simple apparatus which may be retrofitted onto the support frames of conventional J-hook stick conveyors for the positive and accurate placing of spacing sticks onto a stack of lumber. Consequently a vacuum assisted stick retrieval and placement device is provided having two degrees of freedom, namely, a first radial or linear translation and a second rotational translation of a vacuum assisted stick gripping head.

SUMMARY OF THE INVENTION

There are two preferred embodiments to accomplish the removal of a spacing stick from horizontal carriage in a conventional J-hook stick conveyor and positive placement of that stick horizontally onto the top surface of a stack of lumber. The present device provides that a spacing stick may be placed flush with the top surface of the stack of lumber so as to rest on one of its opposed broad sides, rather than on edge, on the lumber stack. In particular, the present device provides a device for accurate stick placement at the ends of the stack of lumber.

The present invention provides a vacuum gripping head which may be adhered by vacuum to the underside of a spacing stick carried horizontally in a J-hook stick conveyor. A vacuum is applied between the vacuum gripping head and the lower broad side of the stick. To place the vacuum gripping head into position so as to retrieve the spacing stick from the J-hooks supporting the spacing stick in the J-hook stick conveyor, hereinafter the stick retrieval position, the vacuum gripping head must be elevated into contact or at least close proximity to the lower broad surface, that is, the undersurface, of a spacing stick held horizontally in the J-hooks.

When the vacuum gripping head is in its stick retrieval position and has been adhered to the lower broad surface of the spacing stick held horizontally in the J-hooks, the spacing stick may be removed from the J-hooks in a substantially horizontal plane so as to clear the spacing stick from the supporting arms of the J-hooks as the J-hooks continuously translate over the lumber stack. The spacing stick may then be lowered to the stack of lumber so as to place the spacing stick with a broad side down, as opposed to placing the spacing stick with an edge of the spacing stick in contact with, or in close proximity to, the top surface of the stack of lumber. With the spacing stick and the vacuum gripping head thereby in a stick placing position, the vacuum adhering the spacing stick to the vacuum gripping head may be removed so as to leave the spacing stick properly positioned on the top surface of the stack of lumber.

The translation between the stick retrieving position and the stick placing position is accomplished in the present invention by coupling an arcuate translator, that is, a rotational translation of the vacuum gripping head, with a linear translation of the vacuum gripping head in a direction radial to the centre of rotation of the rotational translation.

BRIEF DESCRIPTION OF THE DRAWINGS

FIG. 5 is a left side elevation view of the device of FIGS. 1a–1d.

FIG. 6 is a right side elevation view of the device of FIGS. 1a–1d.

FIGS. 9a–9c are partial right side elevation views of the device of FIGS. 8a–8d as illustrated in the orientation depicted in FIG. 8d.

DETAILED DESCRIPTION OF PREFERRED EMBODIMENTS

Figure 1A:
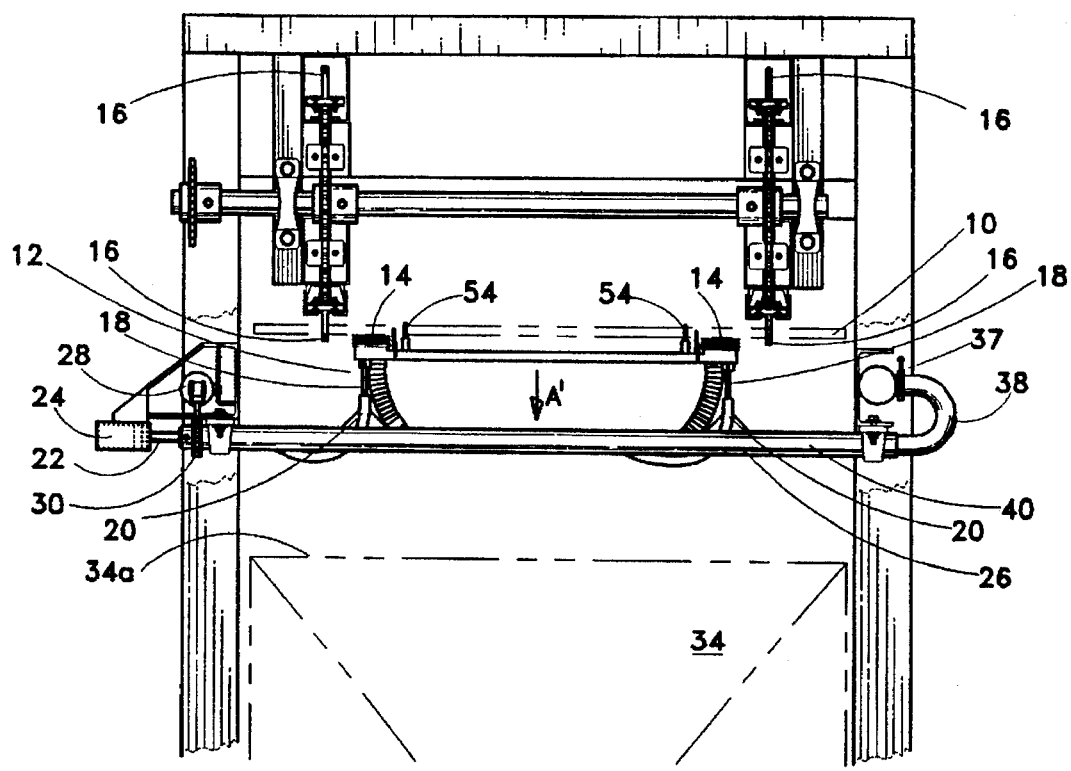
FIGS. 1a, 1b, 1c and 1d are front elevation views of a stick retrieval and placing apparatus of the present invention installed beneath a conventional J-hook stick conveyor.

In a first embodiment, as illustrated in FIGS. 1a–1d, spacing stick 10 is vacuum adhered to vacuum arms 12 at vacuum gripping heads 14 when vacuum arm 12 and vacuum gripping heads 14 are in the stick retrieving position. Spacing stick 10 may thus be removed from J-hook stick supports 16 (hereinafter J-hooks 16) and in particular removed from a position resting on J-hook horizontal support arms 16a better seen in FIG. 2. Once spacing stick 10 is removed from J-hooks 16, spacing stick 10 may be lowered from J-hooks 16 by linear translation of vacuum gripping heads 14 and spacing stick 10 in direction A' from the stick retrieving position illustrated in FIG. 1a to the intermediate stick supporting position illustrated in FIG. 1b. Translation in direction A' is accomplished by retracting flexible actuators 18 into flexible actuator casings or conduits 20. Flexible actuators 18 are retracted by the retraction of ram cylinder 22 into ram cylinder housing 24.

Figure 1B:
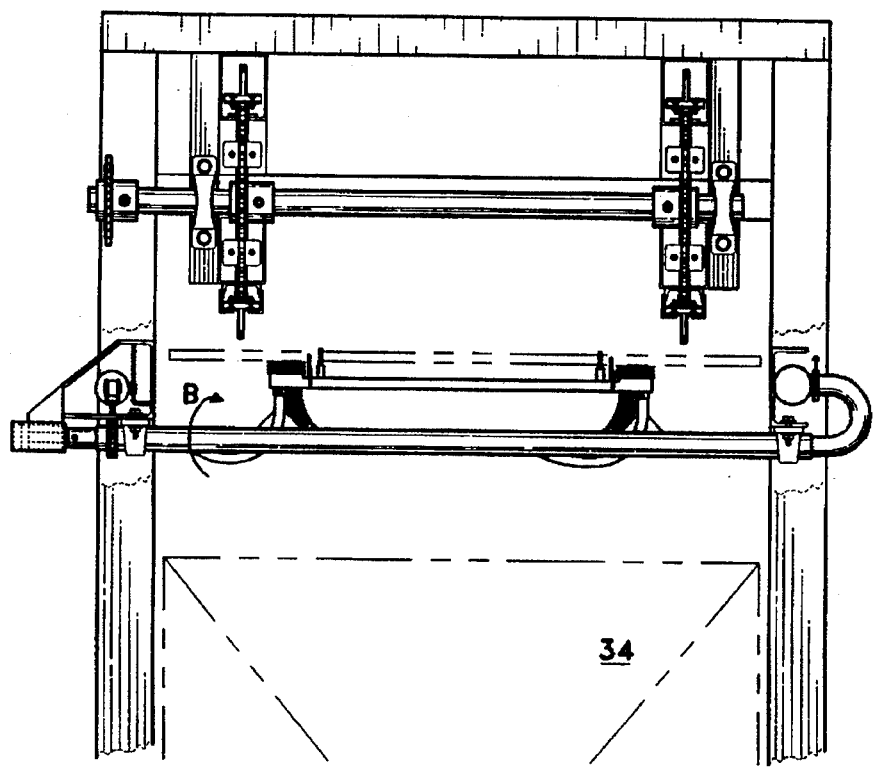
Figure 1C:
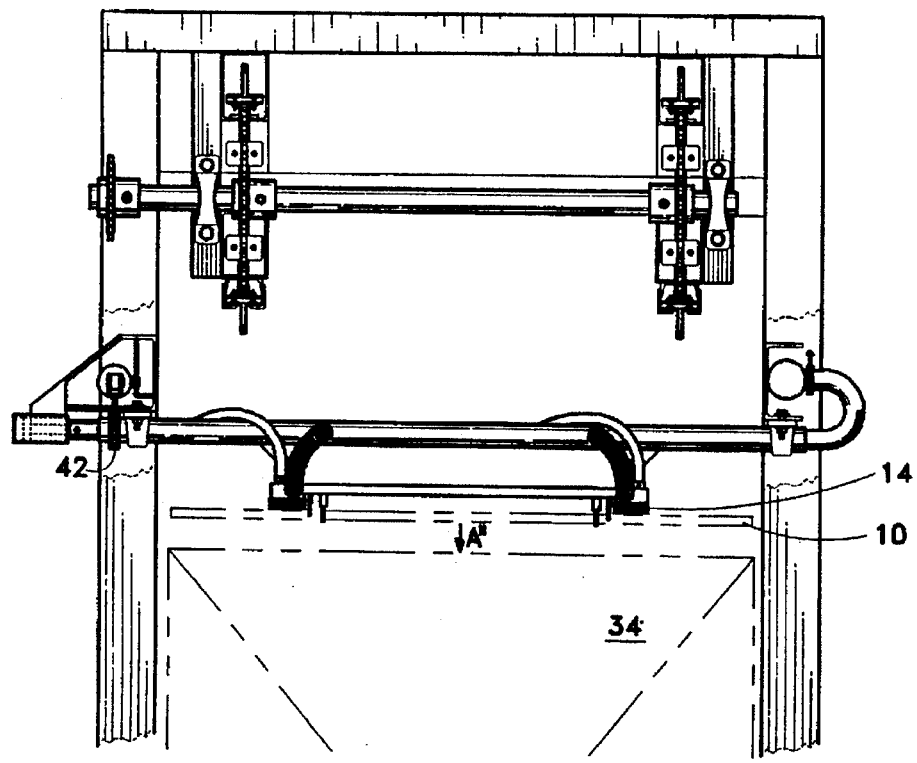
Figure 2:
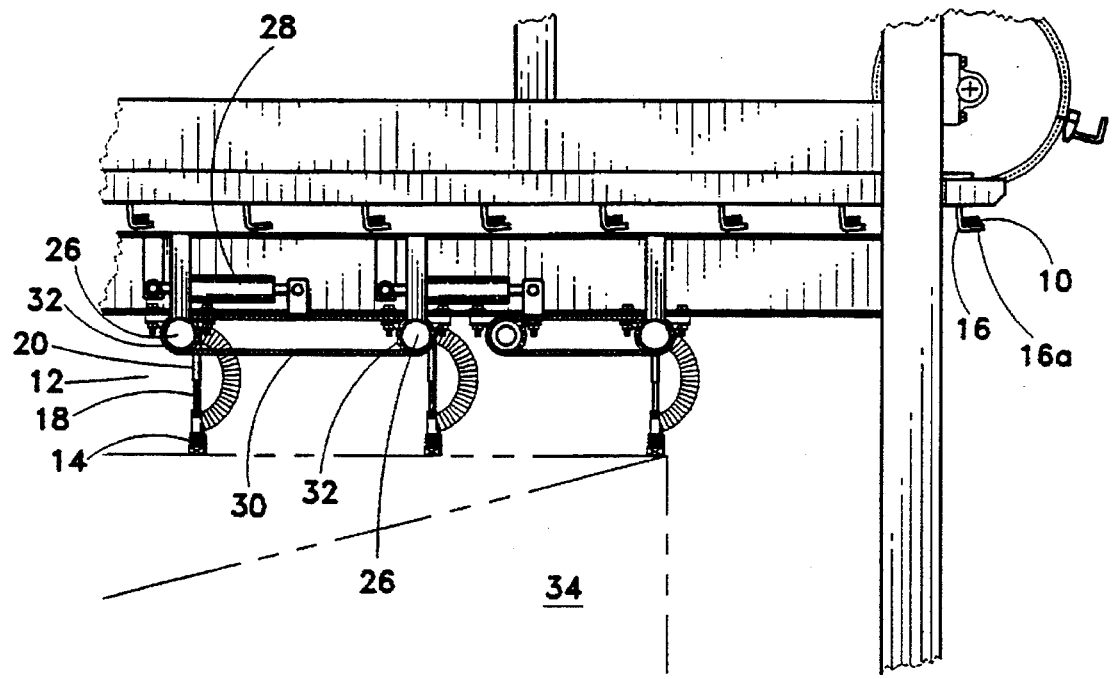
FIG. 2 is a partial left side elevation view of the device of FIGS. 1a–1d as illustrated in the orientation depicted in FIG. 1d.

Vacuum gripping heads 14 and spacing sticks 10 may be rotated from the intermediate supporting position illustrated in FIG. 1b into the intermediate supporting position illustrated in FIG. 1c by rotating vacuum arms 12 on pivot arm 26 in direction B. Pivot arm 26 is rotated in direction B by the action of actuable ram cylinder 28 rotating drive chain 30 about sprockets 32 on pivot arm 26, better illustrated in FIG. 2.

Figure 1D:
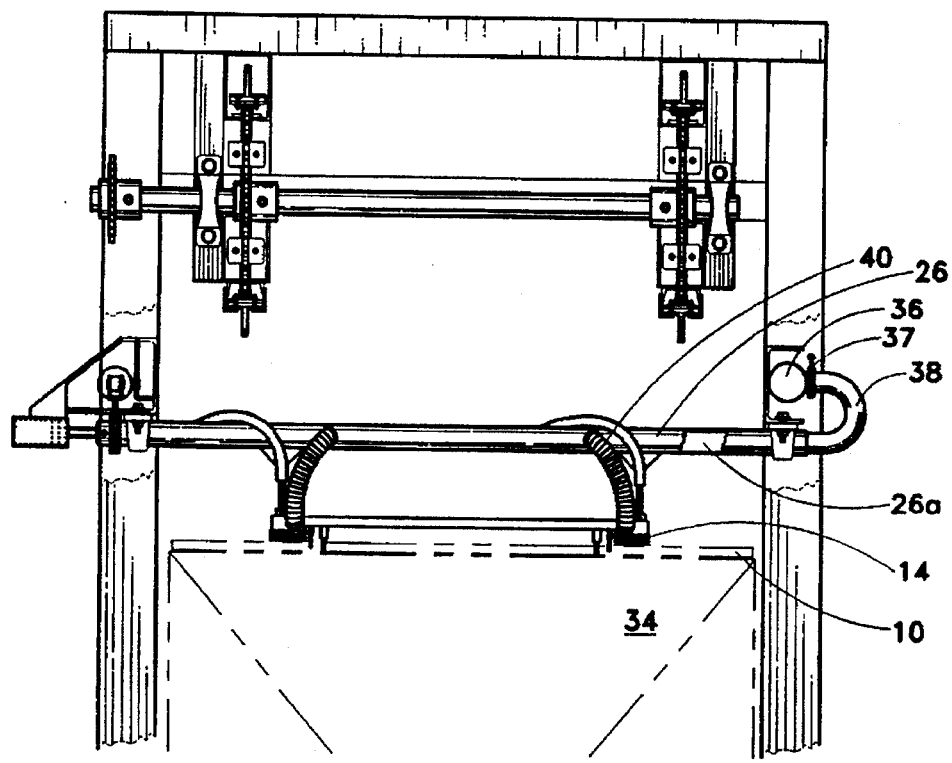

Vacuum gripping heads 14 and spacing sticks 10 may be lowered from the intermediate support position illustrated in FIG. 1c to a lowered stick placing position illustrated in FIG. 1d. Vacuum gripping heads 14 and spacing sticks 10 are translated in direction A" so as to bring spacing sticks 10 into contact or close proximity with upper surface 34a of lumber stack 34 by extending ram cylinder 22 from within ram cylinder housing 24 so as to extend flexible actuators 18 from flexible actuator casings or conduits 20.

Figure 3:
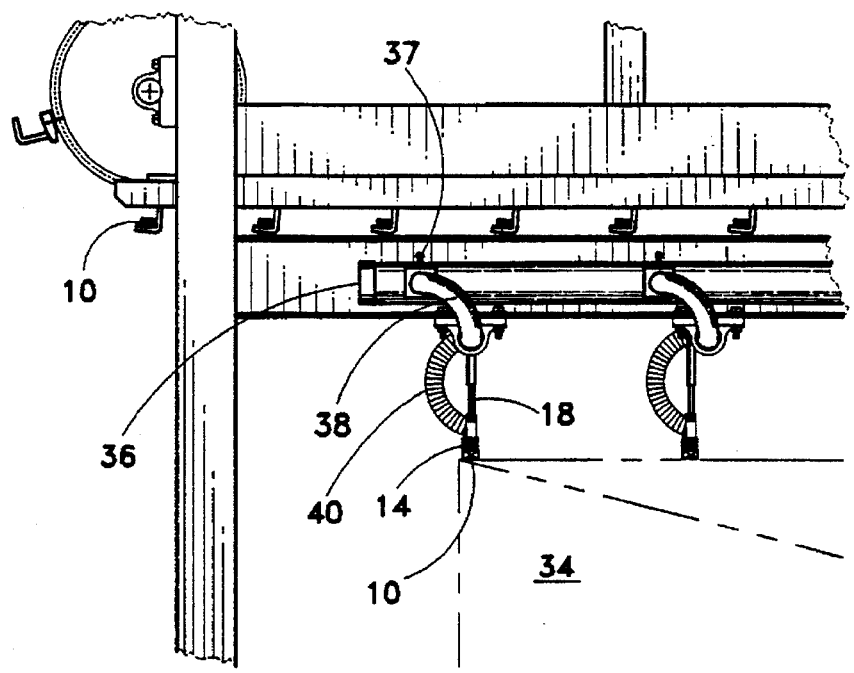
FIG. 3 is a partial right side view of the device illustrated in FIGS. 1a–1d.

With spacing sticks 10 in contact or close proximity with upper surface 34a of lumber stack 34, the vacuum may be released by allowing atmospheric air into, for example, vacuum manifold 36 so as to release spacing sticks 10 from vacuum gripping heads 14. Spacing sticks 10 are thereby accurately placed onto upper surface 34a of lumber stack 34. As also illustrated in FIG. 3, the vacuum is communicated to vacuum gripping heads 14, and in particular to vacuum orifice 14a (see FIG. 4b), from vacuum manifold 36 via vacuum conduit 38 and extends within or communicates with a hollow cavity 26a within pivot arm 26 and flexible vacuum hoses 40.

Vacuum is supplied to vacuum manifold 36 via, for example, vacuum port 39 from a vacuum source, not shown, of a type well known in the art. In order to equalize, that is evenly distribute, the vacuum applied through vacuum orifices 14a, more than one vacuum port 39 may be incorporated along vacuum manifold 36. In addition, the sizes (i.e. diameter, length and volume capacity) of the vacuum orificies within flexible vacuum hoses 40, pivot arm 26, vacuum manifold 36, and vacuum conduits 38, may be varied to equalize the vacuum applied through vacuum orifices 14a on the array of vacuum gripping heads 14 spaced along, and co-operating with, vacuum manifold 36. Vacuum shut off valve 37 may be provided between vacuum manifold 36 and vacuum conduit 38.

Figure 4A:
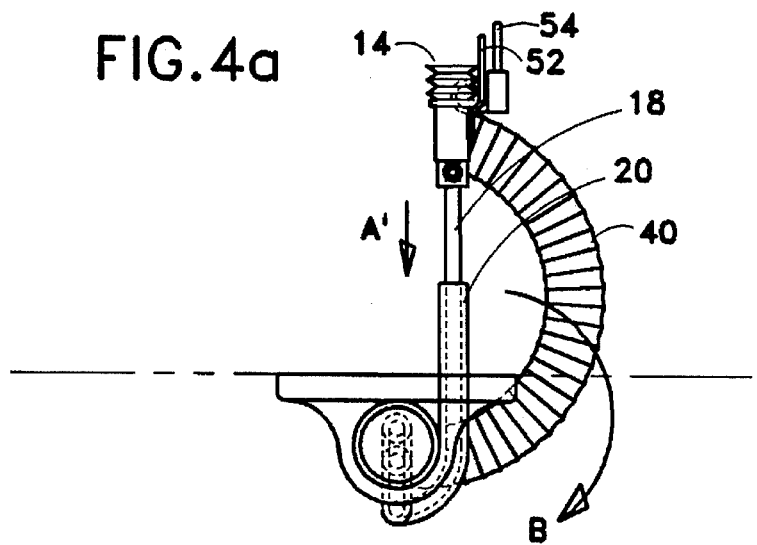
FIGS. 4a–4c are right side fragmentary views of the vacuum actuated stick placer of FIGS. 1a–1d.
Figure 4B:
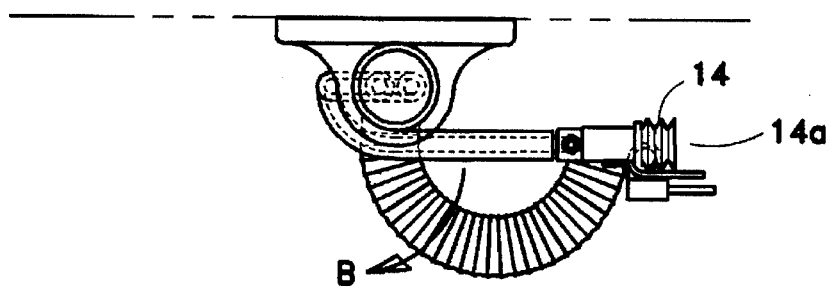
Figure 4C:
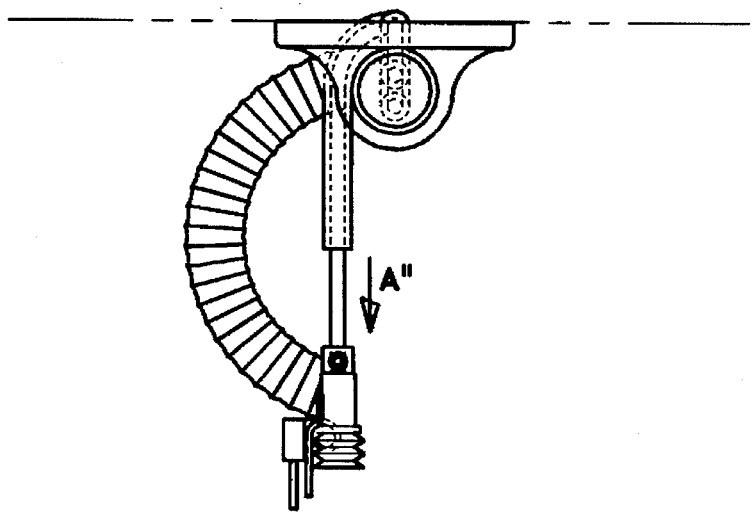

It is understood that the rotational and linear translations of spacing sticks 10 and vacuum gripping heads 14 in directions A', B and A" illustrated in FIGS. 1a, 1b and 1c may be simultaneous as illustrated in FIGS. 4a–4c. Thus gripping heads 14, flexible actuator 18, flexible actuator casings or conduits 20 and flexible vacuum hoses 40 may be rotated in direction B simultaneously with gripping heads 14 being retracted in direction A' and subsequent extention in direction A".

Figure 7:
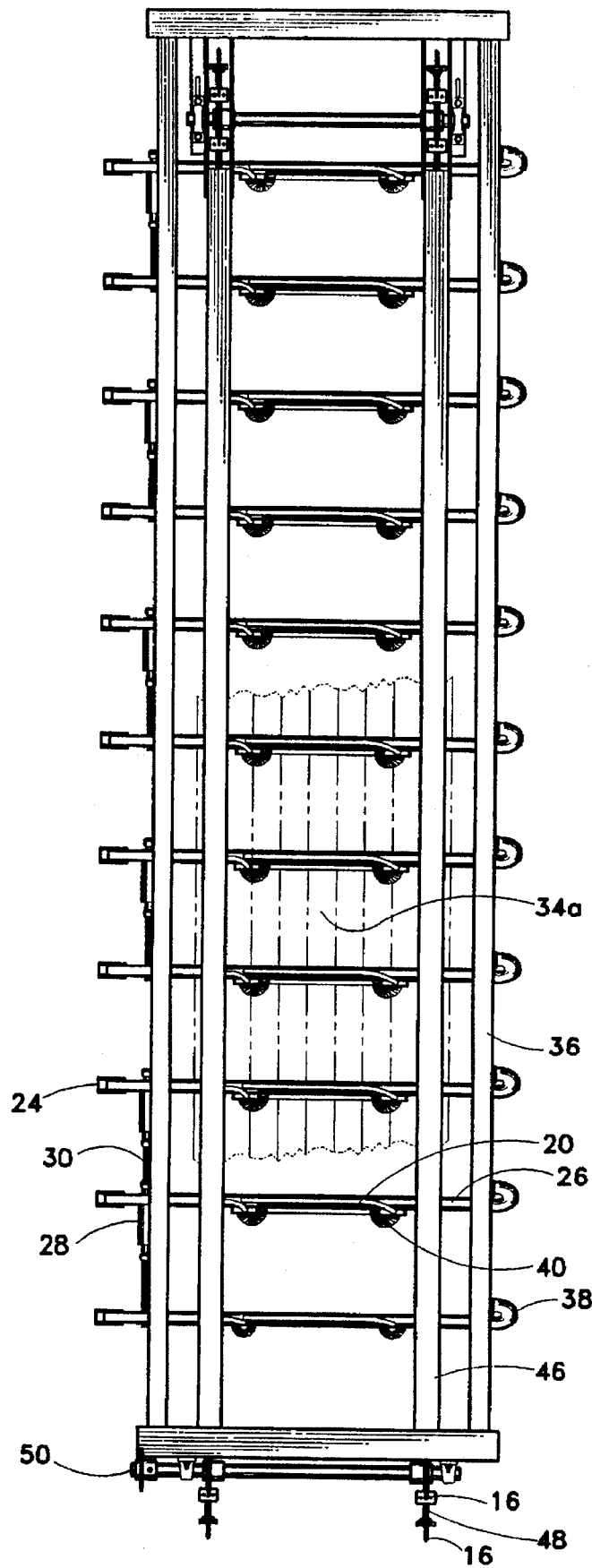
FIG. 7 is a plan view of the device of FIGS. 1a–1d.
Figure 8A:
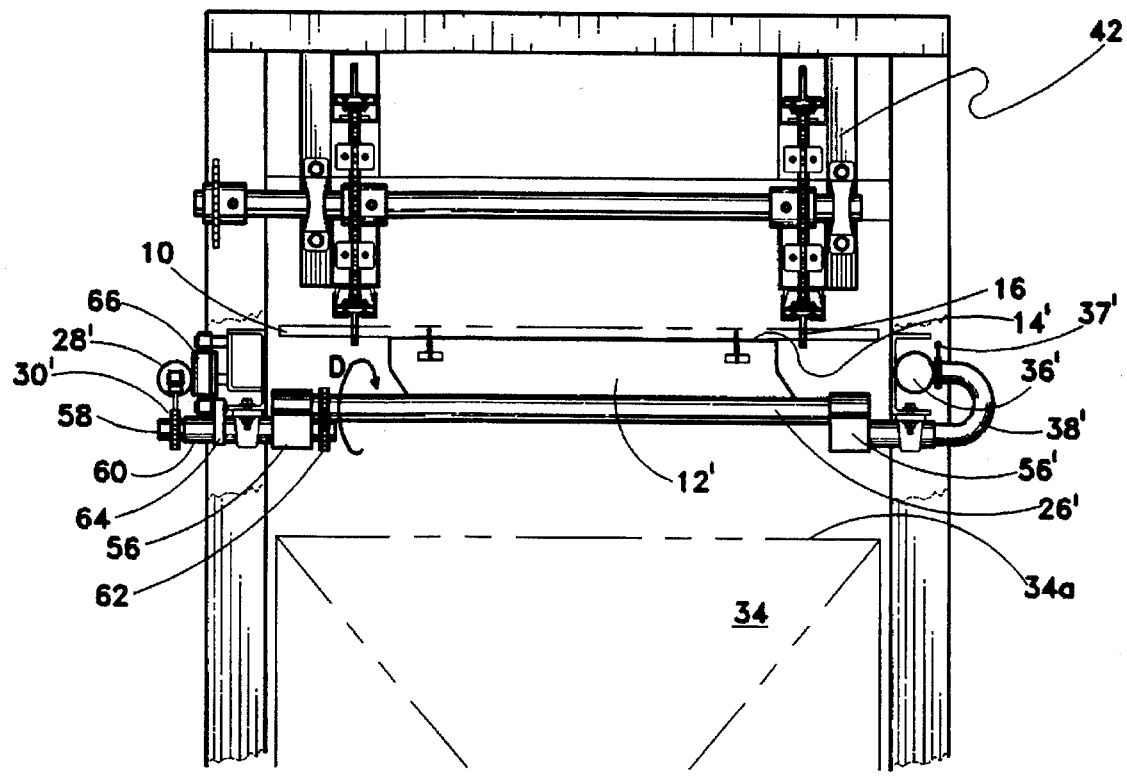
FIGS. 8a, 8b, 8c and 8d are front elevation views of a stick retrieval and placing apparatus of the present invention installed beneath a conventional J-hook stick conveyor.
Figure 8B:
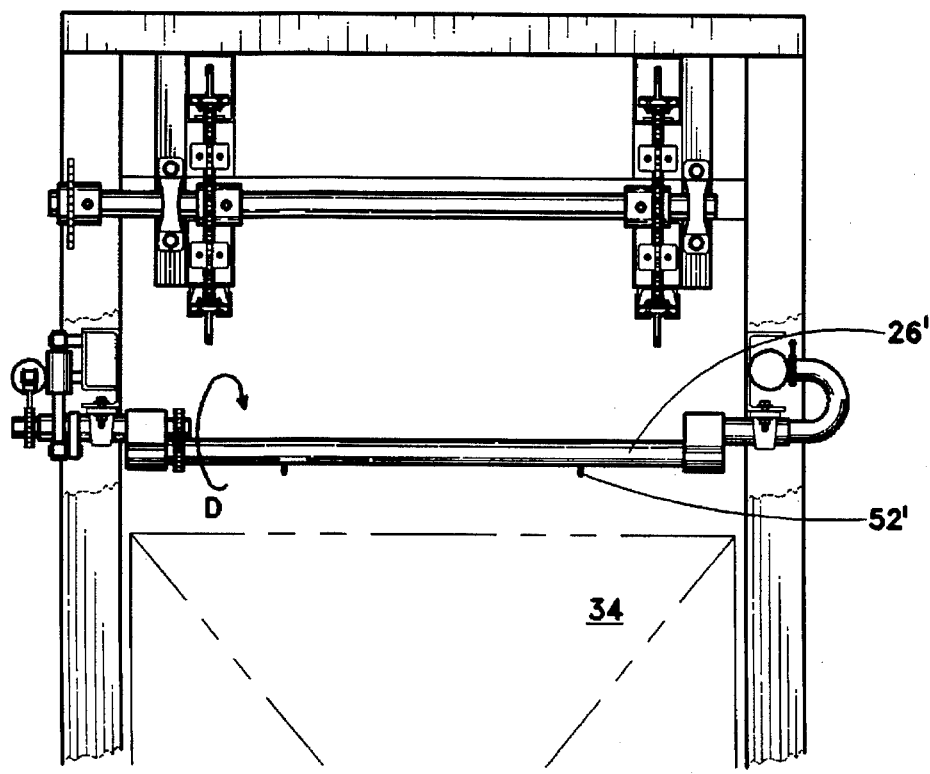
Figure 8C:
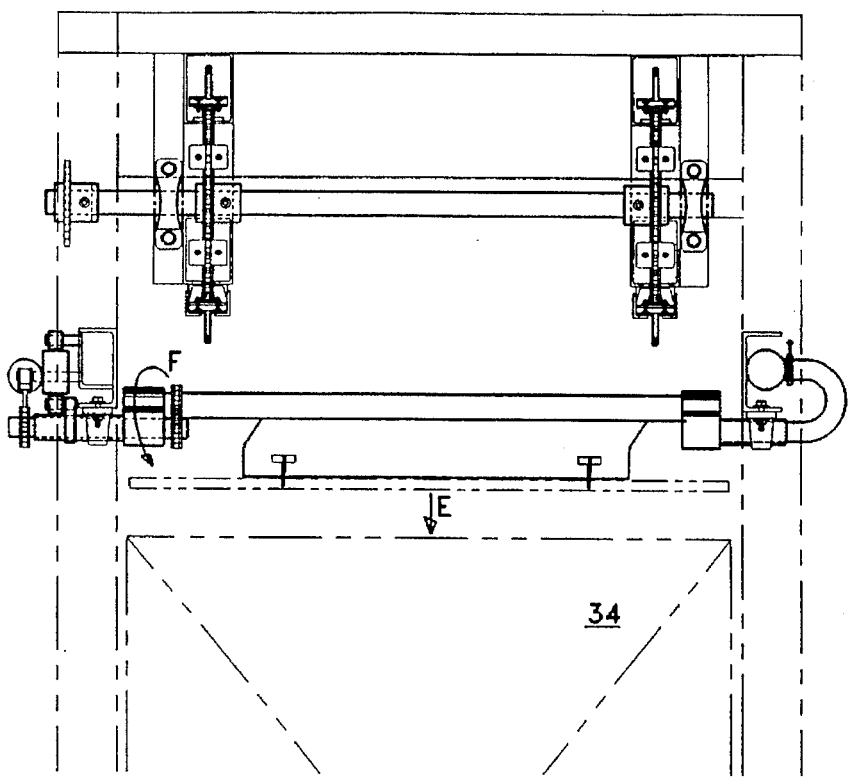
Figure 8D:
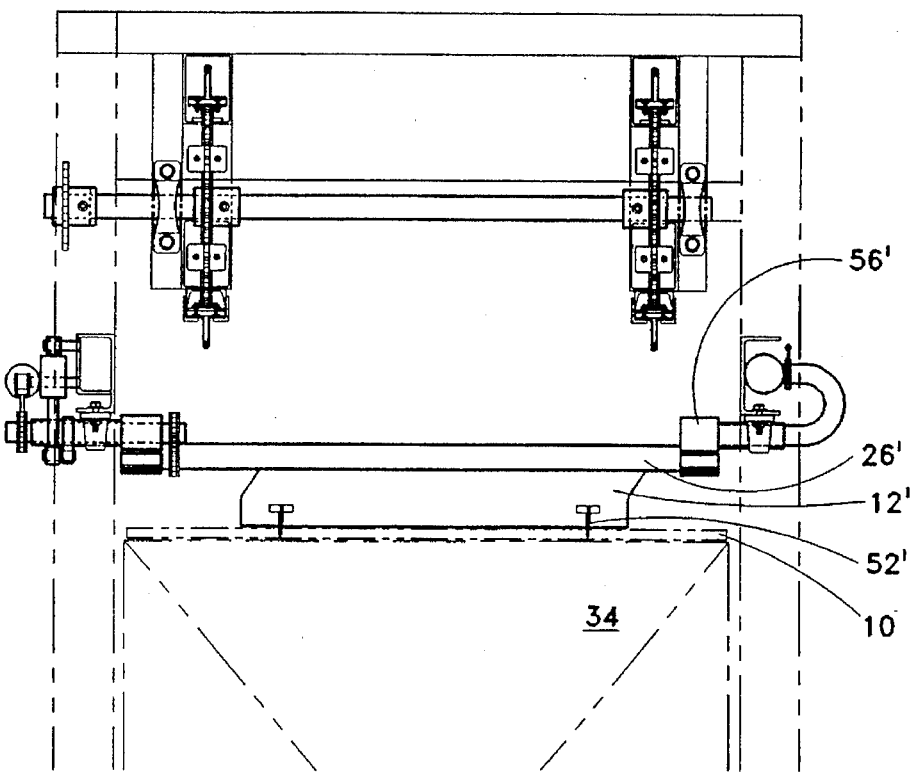

As illustrated in FIGS. 5, 6 and 7 continuous J-hook stick conveyor 42 conveys sticks 10 in J-hooks 16 in direction C. J-hooks 16 are mounted on continuous chain 44. Continuous chain 44 runs inside channel guides 46 and around sprockets 48. It is understood that a stick allocator (not shown) would conventionally load individual spacing sticks 10 onto J-hooks 16. One of sprockets 48 will conventionally be a drive sprocket driven for example by drive axle 50.

Finger-like protrusions 52 are provided to assist vacuum arm 12 in removal of spacing sticks 10 from J-hooks 16. Finger-like protrusions 52 may be of resilient wire as illustrated. Finger-like protrusions 52 may be securely mounted to vacuum arm 12 on the downstream side of vacuum arm 12 relative to direction C movement of J-hooks 16 on J-hook stick conveyor 42. Thus when vacuum arm 12 is raised into its stick retrieving position, finger-like protrusions 52 engage spacing sticks 10 so as to push spacing sticks 10 from J-hook support arms 16a thereby assisting vacuum gripping head 14 in removing spacing stick 10 from J-hook 16.

Limit switches of a type known in the prior art, such as telescoping limit switches 54, may be provided to cut-off ram cylinder 22 when one or more of limit switches 54 contact upper surface 34a of lumber stack 34. A triggering of one of more limit switches 54 could either cut-off single ram cylinder 22 (i.e. the cylinder 22 directly corresponding to that switch 54) or a plurality of ram cylinders 22 actuating the array of actuators 18. Limit switches 54 enable flexible actuators 18 to be extended until positive contact with upper surface 34a of lumber stack 34 is made, and thus take into account irregularities from warped boards and the like on upper surface 34a.

A second embodiment of the present invention is illustrated in FIGS. 8–13. As illustrated in FIG. 8a, spacing stick 10 is gripped by vacuum arm 12' at vacuum gripping head 14' when vacuum arm 12' and vacuum gripping heads 14' are in the stick retrieving position. Spacing stick 10 may thus be removed from J-hook stick supports 16 and in particular removed from a position resting on J-hook horizontal support arms 16a better seen in FIG. 10. Once spacing stick 10 is removed from J-hooks 16, and spacing stick 10 is adhered by means of vacuum to vacuum gripping head 14', vacuum arm 12' may be rotated on pivot arm 26' in direction D so as to pass through the intermediate rotated position illustrated in FIG. 8b into the rotated position illustrated in FIG. 8c substantially rotated 180 degrees from the stick retrieving position of FIG. 8a. From the rotated position illustrated in FIG. 8c, vacuum arm 12', still gripping spacing stick 10 at vacuum gripping head 14', may be lowered by swing arms 56 and 56' so as to bring spacing stick 10 into contact or close proximity with top surface 34a of lumber stack 34. As illustrated in FIG. 8c and FIGS. 9a–9c, swing arms 56 and 56' translate vacuum arm 12' substantially vertically in direction E.

Pivot arm 26' is rotated in direction D by actuable ram cylinder 28' rotating drive chain 30' about sprockets 32' on shaft 58. Shaft 58 is rotatably journalled through rotatable collar 60 so as to rotate secondary drive chain 62 thereby engaging and rotating pivot arm 26'. The ends of pivot arm 26' are rotatably journalled in swing arms 56 and 56'.

Swing arm 56 is rigidly mounted to rotatable collar 60. Also rigidly mounted to rotatable collar 60 is linkage 64. Actuable ram cylinder 66 is rotatably connected to rotatable collar 60 via linkage 64 so that actuating ram cylinder 66 rotates linkage 64, rotatable collar 60, swing arm 56, pivot arm 26', vacuum arm 12' (including vacuum gripping head 14'), and swing arm 56' in direction F so as to thereby lower or raise in directions E and E' respectively vacuum gripping head 14' and spacing stick 10.

It is understood that translations D, E and F, as illustrated in FIGS. 8a–8c and FIGS. 9a and 9b, may be simultaneous. Thus vacuum gripping head 14' holding spacing stick 10 on vacuum arm 12' may be simultaneously rotated in direction D and lowered in direction E so as to bring spacing stick 10 into contact or close proximity with top surface 34a of lumber stack 34.

As illustrated in FIG. 9c, the vacuum applied between vacuum gripping head 14' and spacing stick 10 through vacuum nozzle 68 may be released to place spacing stick 10 onto top surface 34a of lumber stack 34. It is understood that vacuum nozzle 68 may be an elongated slit or orifice on vacuum gripping head 14' or an array of orifices on vacuum gripping head 14'. The vacuum applied between spacing stick 10 and vacuum gripping head 14' through vacuum nozzle 68 is communicated to vacuum nozzle 68 from vacuum manifold 36' through hollow vacuum arm 12', hollow pivot arm 26', hollow swing arm 56', and vacuum conduit 38'. Once the vacuum is released from vacuum nozzle 68 and spacing stick 10 left on top surface 34a of lumber stack 34, vacuum arm 12' may be retracted from its stick placing position vertically upwards in direction E' to raise finger-like protrusions 52' above spacing stick 10 and therafter raised vertically in direction E' while being rotated in direction D' so as to be repositioned under J-hook stick conveyor 42. Another spacing stick 10 may then be selectively retrieved from J-hooks 16 as J-hooks 16 carrying spacing sticks 10 are conveyed in direction G.

Figure 10:
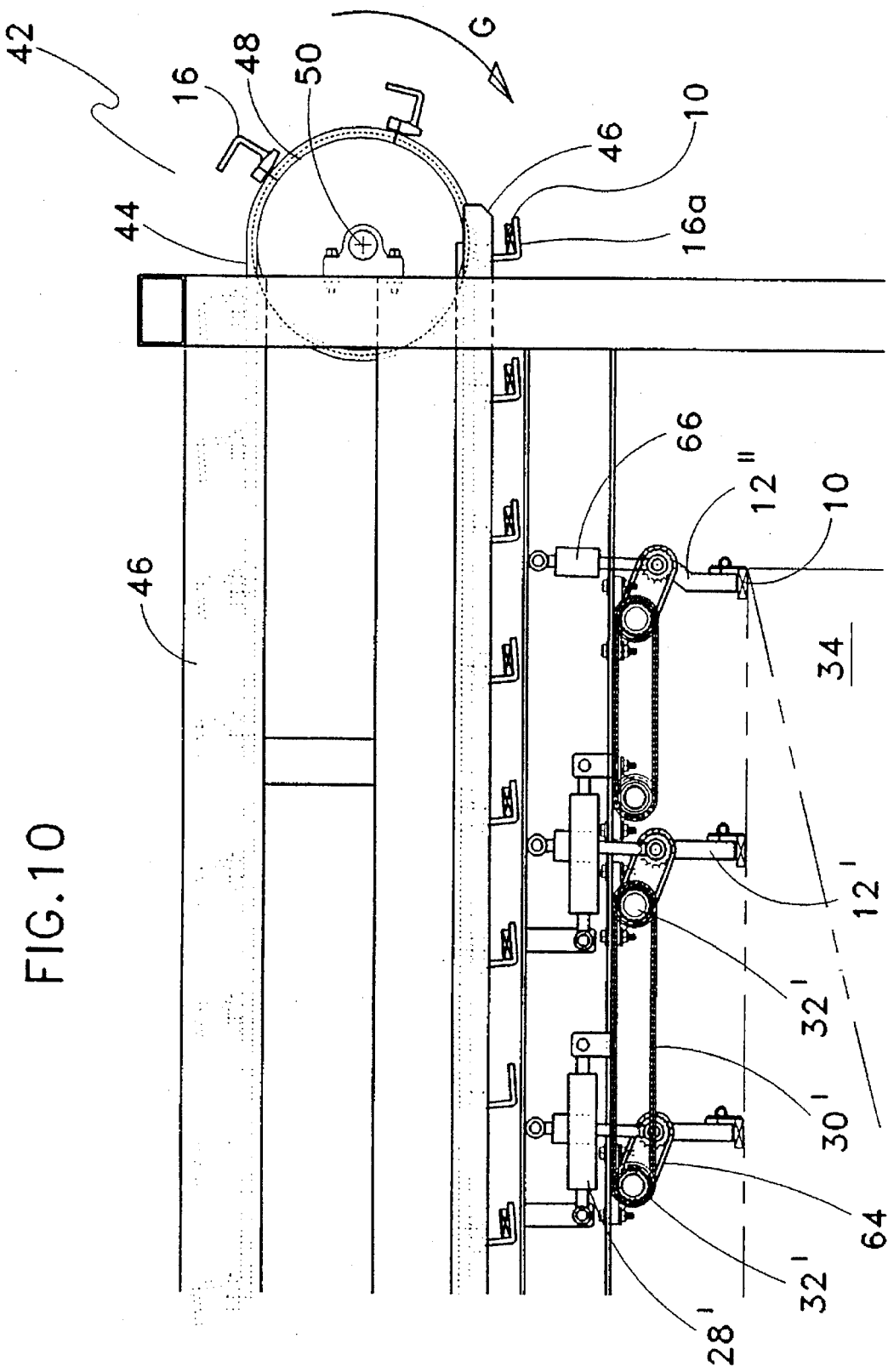
FIG. 10 is a partial left side view of the device illustrated in FIGS. 8a–8d.
Figure 11:
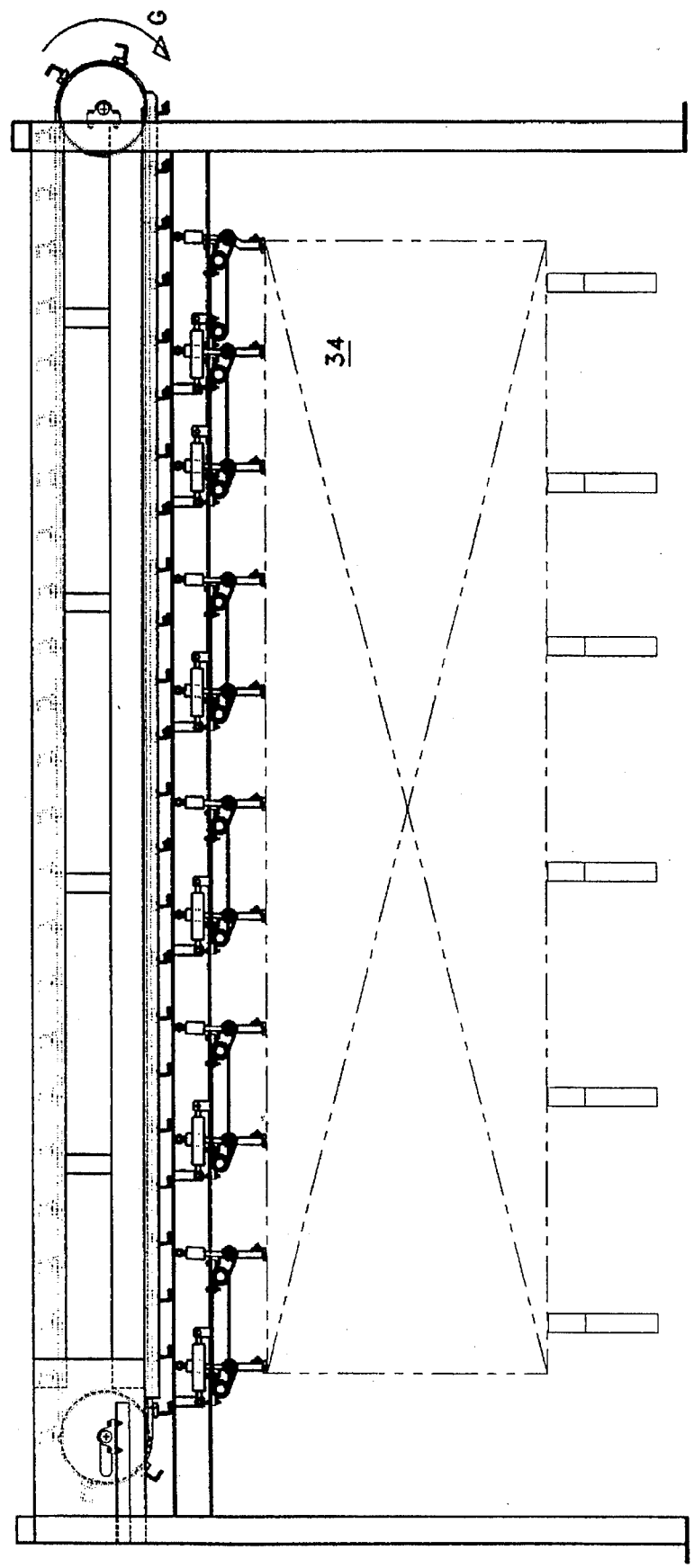
FIGS. 11 is a left side fragmentary view of the vacuum actuated stick placer of FIGS. 8a–8d.
Figure 12:
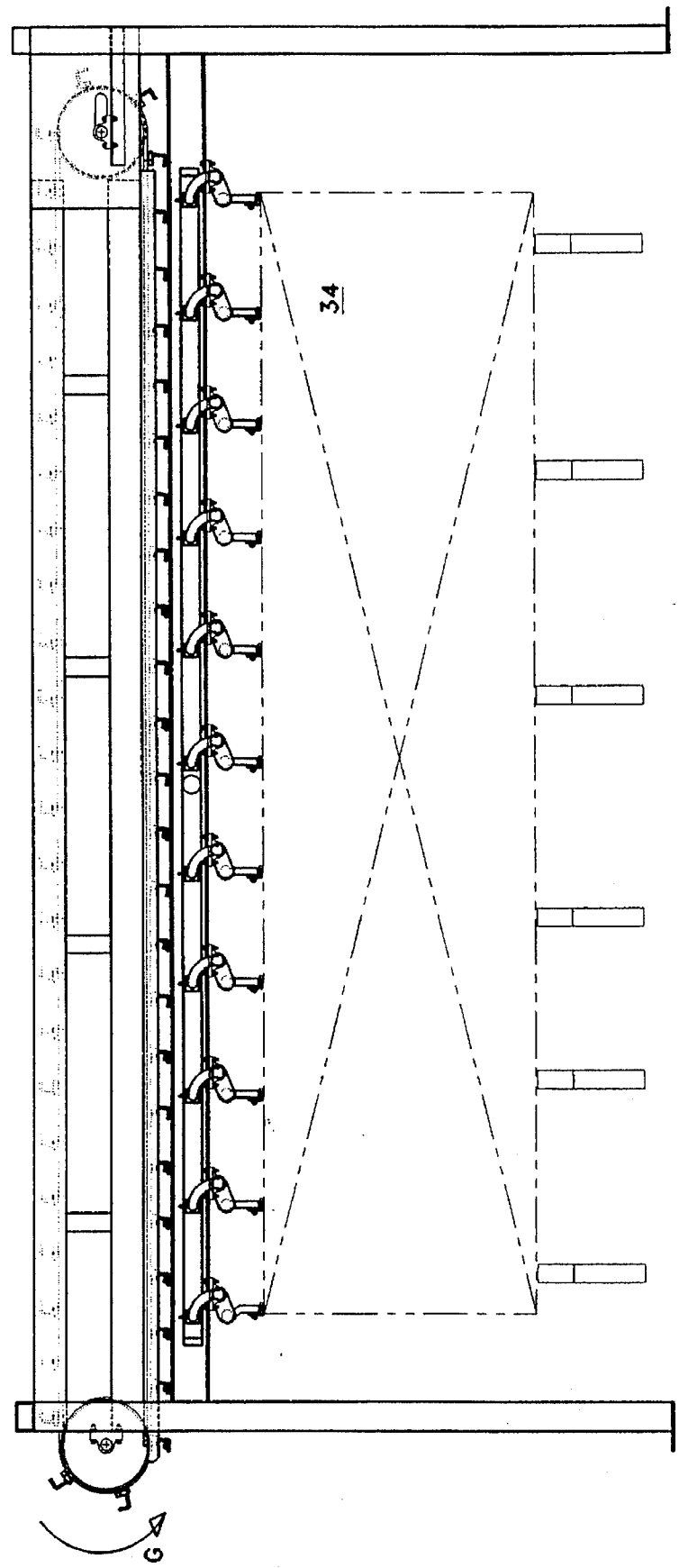
FIG. 12 is a right side elevation view of the device of FIGS. 8a–8d.
Figure 13:
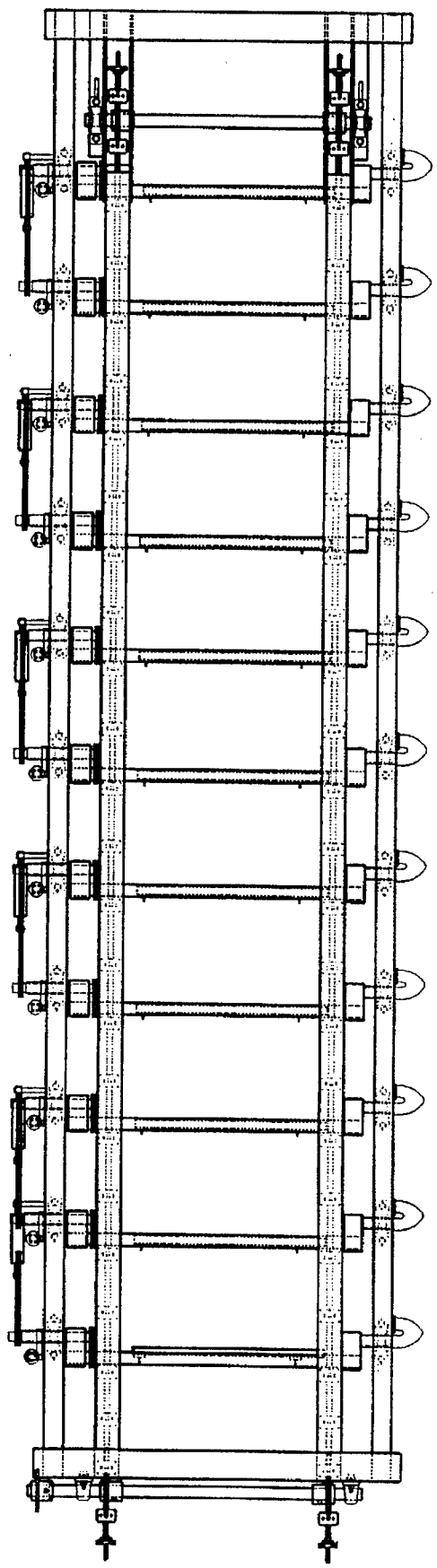
FIG. 13 is a plan view of the device of FIGS. 8a–8d.

Illustrated in FIGS. 10–12 is the manner in which vacuum arm 12" may be bent or canted so as to offset a spacing stick 10 from the spacing otherwise employed between individual vacuum arms 12'. The bent or canted vacuum arm 12" allows accurate placement of a spacing stick 10 along the end edges of top surface 34a of lumber stack 34.

Finger-like protrusions 52' are provided to assist vacuum arm 12' in retrieval of spacing sticks 10 from J-hooks 16. Finger-like protrusions 52' may be of resilient wire design as illustrated. Finger-like protrusions 52' are securely mounted to vacuum arm 12' on the downstream side of vacuum arm 12' relative to direction G movement of J-hooks 16 on J-hook stick conveyor 42. Thus when vacuum arm 12' is raised into its stick retrieving position, finger-like protrusions 52' engage spacing sticks 10 so as to push spacing sticks 10 from J-hook support arms 16a thereby assisting vacuum gripping head 14' removing spacing stick 10 from J-hook 16. As described above with respect to the first embodiment of the present invention, limit switches may be incorporated on the second embodiment and in particular, although not illustrated, telescoping limit switches 54 might extend beyond, and parallel to, fingerlike protrusions 52' from vacuum arm 12'.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A stick placer for:
   (a) retrieving an elongate spacing stick from a J-hook on a longitudinally extending J-hook stick conveyor, whereon a first broad side of said stick is supported on said J-hook and said stick is supported along its length laterally across said longitudinally extending J-hook stick conveyor by said J-hook, and (b) placing said stick onto a top surface of a stack of lumber comprising:

selectively actuable vacuum gripping means for:

(a) selectively applying a vacuum to said first broad side of said stick whereby said stick may be adhered to said vacuum gripping means when said vacuum gripping means is in a stick retrieving position snug beneath said first broad side of said stick supported in said J-hook, and (b) selectively removing said vacuum from said first broad side of said stick whereby said stick may be released from said vacuum gripping means, when said vacuum gripping means is in a stick placing position substantially opposed to said stick retrieving position and proximate said top surface of said stack of lumber, first translation means for rotatably translating said vacuum gripping means in an arcuate path and second translation means for substantially linearly translating said vacuum gripping means in a radial direction from said arcuate path, said first and second translation means translating said vacuum gripping means between said stick retrieving position and said stick placing position, a support frame for supporting said first and second translation means over said stack of lumber, whereby a second broad side of said stick opposed to said first broad side may be placed into contact with said top surface of said stack of lumber.

2. The placer of claim 1 wherein said first translation means is a selectively rotatable arm having said vacuum gripping means at a first end of said arm, said selectively rotatable arm rotatably mounted at a second end of said selectively rotatable arm, opposed to said first end of said selectively rotatable arm, to said second translation means, and wherein said second translation means comprises a selectively elevatable arm having first and second ends, said selectively rotatable arm rotatably mounted to said first end of said selectively elevatable arm, said second end of said selectively elevatable arm opposed to said first end of said selectively elevatable arm rotatably mounted to said support frame.

3. The placer of claim 2 wherein said vacuum gripping means further comprises an abutment means for engaging an edge of said stick supported in said J-hook when said vacuum gripping means is in said stick retrieving position, whereby said abutment means for engaging an edge of said stick supported in said J-hook is placed in the path of said stick supported in said J-hook as said stick is conveyed by said J-hook stick conveyor so as to remove said stick from said J-hook onto said vacuum gripping means.

4. The placer of claim 3 further comprising a vacuum manifold communicating with a vacuum source and with a vacuum conduit, said vacuum conduit communicating said vacuum to a vacuum outlet orifice on said vacuum gripping means, said vacuum conduit extending within said selectively rotatable arm.

5. The placer of claim 4 wherein said selectively rotatable arm is an elongate member rotatably mounted generally perpendicular relative to said longitudinally extending J-hook stick conveyor in a direction parallel to said stick when said stick is supported along its length laterally across said longitudinally extending J-hook stick conveyor by said J-hook.

6. The placer of claim 5 wherein said abutment means for engaging of an edge of said stick comprises a resilient finger-like extension extending vertically from said selectively rotatable arm when said vacuum gripping means is in said stick retrieving position.

7. The placer of claim 6 wherein said first translation means further comprises a first selectively actuable ram mounted at one end of said selectively actuable ram to said support frame and at an opposed end of said selectively actuable ram to a first drive linkage for rotational engagement with a first axle extending from said selectively rotatable arm, said first axle rotatably engaging said selectively rotatable arm, whereby actuating said first selectively actuable ram moves said first drive linkage to thereby rotate said first axle and said selectively rotatable arm.

8. The placer of claim 7 wherein said selectively rotatable arm further comprises a second axle spaced apart from and parallel to said first axle, said second axle rotatably supporting said selectively rotatable arm on said support frame, and said second axle being hollow so as to provide a conduit for communicating said vacuum between a vacuum manifold and a hollow arm, said hollow arm rotatably mounting said first axle to said second axle.

9. The placer of claim 8 wherein said rotatable engagement of said first axle with said selectively rotatable arm comprises a second drive linkage between said first axle and said selectively rotatable arm.

10. The placer of claim 9 wherein said second translation means further comprises a second selectively actuable ram mounted at one end of said second selectively actuable ram to said support frame and at an opposed end of said second selectively actuable ram to a third drive linkage engaging a rotatable sleeve extending from and rigidly mounted to said selectively elevatable arm, said rotatable sleeve extending over said first axle, whereby actuating said second selectively actuable ram moves said third drive linkage to thereby rotate said rotatable sleeve and said selectively elevatable arm.

11. The placer of claim 10 wherein said J-hook stick conveyor comprises an opposed pair of J-hook stick conveyors having opposed corresponding pairs of J-hooks for supporting said stick between said opposed pairs of corresponding J-hooks and wherein said selectively rotatable arm extends between said opposed pairs of corresponding J-hooks when said vacuum gripping means is in said stick retrieving position.

12. The placer of claim 11 wherein said first selectively actuable ram is substantially horizontal and said second selectively actuable ram is substantially vertical, and wherein said first and second drive linkages are drive chains and said third drive linkage is a lever arm.

13. The placer of claim 1 wherein said second translation means comprises a selectively actuable piston having said gripping means mounted thereto at a first end of said piston, said second translation means rigidly mounted to said first translation means at a second end of said piston opposed to said first end of said piston, and wherein said first translation means is a selectively rotatable member rotatably mounted to said support frame.

14. The placer of claim 13 wherein said second translation means further comprises a flexible piston actuator having first and second ends and a flexible piston actuator conduit housing said flexible piston actuator slidingly therein, said first end of said flexible piston actuator engaging said second end of said piston, said flexible piston actuator conduit adapted to receive said piston snugly therein when said piston is retracted by said flexible piston actuator, a second end of said flexible piston actuator conduit, opposed to a first end of said flexible piston actuator conduit corresponding to said first end of said flexible piston actuator, co-operating with a selectively actuable means for extending and retracting said flexible piston actuator.

15. The placer of claim 14 wherein said means for extending and retracting said flexible piston actuator is a first selectively actuable ram mounted at one end of said first selectively actuable ram to said support frame and at an opposed end of said first selectively actuable ram to said second end of said flexible piston actuator.

16. The placer of claim 15 wherein said vacuum gripping means comprises a resilient shroud encircling and extending from a vacuum outlet orifice, whereby said resilient shroud extends resiliently from said vacuum outlet orifice to engage said first broad side of said stick when said vacuum gripping means is in said stick retrieving position.

17. The placer of claim 16 wherein said vacuum gripping means further comprises an abutment means for engaging an edge of said stick supported in said J-hook when said vacuum gripping means is in said stick retrieving position, whereby said abutment means for engaging an edge of said stick in said J-hook is placed in the path of said stick supported in said J-hook as said stick is conveyed by said J-hook stick conveyor so as to push said stick from said J-hook onto said vacuum gripping means.

18. The placer of claim 17 wherein a vacuum manifold communicates at one end of said vacuum manifold with a vacuum source and at another end with a vacuum conduit, said vacuum conduit communicating said vacuum to said vacuum outlet orifice on said vacuum gripping means.

19. The placer of claim 18 wherein said selectively rotatable member extends between opposed members of said support frame and is rotatably mounted therebetween.

20. The placer of claim 19 wherein said first selectively actuable ram is mounted at a first end of said selectively rotatable member, a second end opposed to said first end of said selectively rotatable member having a hollow cavity therein adapted to provide a conduit for said vacuum communicating with said vacuum manifold communicating between said vacuum gripping means and said vacuum conduit.

21. The placer of claim 20 wherein said conduit for said vacuum further comprises a resilient vacuum hose communicating at one end with said selectively rotatable member and at another end with said vacuum gripping means.

22. The placer of claim 21 wherein said J-hook stick conveyor comprises a longitudinally spaced apart array of opposed pairs of J-hook stick conveyors having opposed corresponding pairs of J-hooks for supporting sticks transversely between opposed corresponding pairs of J-hooks and said vacuum gripping means comprises a longitudinally spaced apart array of opposed pairs of vacuum gripping means lying transversely between and substantially parallel to said opposed pairs of corresponding J-hooks when said vacuum gripping means are in said stick retrieving position.

23. The placer of claim 22 wherein said first translation means further comprises a second selectively actuable ram for selectively rotating said selectively rotatable member.

24. The placer of claim 22 wherein said vacuum is equalized between said longitudinally spaced apart array of opposed pairs of vacuum gripping means.

* * * * *